(12) United States Patent
Bai

(10) Patent No.: US 9,697,795 B2
(45) Date of Patent: Jul. 4, 2017

(54) VIDEO PROCESSING DEVICE AND METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Jian Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 33 days.

(21) Appl. No.: 14/801,780

(22) Filed: Jul. 16, 2015

(65) Prior Publication Data

US 2016/0078843 A1    Mar. 17, 2016

(30) Foreign Application Priority Data

Sep. 12, 2014  (CN) .......................... 2014 1 0464820

(51) Int. Cl.
*G09G 5/02*   (2006.01)
*G09G 3/20*   (2006.01)
(Continued)

(52) U.S. Cl.
CPC .................. *G09G 5/02* (2013.01); *H04N 9/67* (2013.01); *G09G 2340/0428* (2013.01)

(58) Field of Classification Search
CPC combination set(s) only.
See application file for complete search history.

(56) References Cited

U.S. PATENT DOCUMENTS 5,264,840 A * 11/1993 Wells ...................... G06T 5/007
                                                       345/599
5,714,974 A    2/1998 Liu et al.
(Continued)

FOREIGN PATENT DOCUMENTS

CN        1932752      3/2007
CN        1969534      5/2007
(Continued)

OTHER PUBLICATIONS

Chinese Office Action with English Language Translation, dated Dec. 28, 2015, Chinese Application No. 201410464820.6.
(Continued)

*Primary Examiner* — Wesner Sajous
(74) *Attorney, Agent, or Firm* — Blakely Sokoloff Taylor & Zafman LLP

(57) ABSTRACT

The present disclosure discloses a video processing device and method, the device comprising a dual matrix selecting module and a dual channel color data processing module. Due to the use of the dual channel color data processing module, two groups, i.e. an odd group and an even group, of pixel data can be processed simultaneously within one clock period. Since two dithering matrices are used when two adjacent frames of images are displayed, the structure is simple, and the processing speed is high. The present disclosure uses the algorithm period of two frame cycle for dithering in time and uses the dithering matrix of 2*2 for dithering in space, so as to achieve the effect of dithering 8 bit video data using 6 bit display data. Moreover, due to the use of two dithering matrices, the display performance of the display can be improved, two groups, i.e. an odd group and an even group, of pixel data are processed simultaneously within one clock, which reduces the working frequency of the circuit.

11 Claims, 3 Drawing Sheets

(51) Int. Cl.
*H04N 9/67* (2006.01)
*H04N 1/60* (2006.01)
*H04N 1/58* (2006.01)

(56) References Cited

U.S. PATENT DOCUMENTS

| | | | |
|---|---|---|---|
| 5,953,549 A * | 9/1999 | Morisawa | H04N 1/00249 396/429 |
| 6,731,400 B1 * | 5/2004 | Nakamura | G06K 15/00 358/1.9 |
| 7,088,370 B1 * | 8/2006 | Dotson | G09G 5/006 345/418 |
| 2005/0128222 A1 * | 6/2005 | Huang | G09G 3/2022 345/690 |
| 2008/0117198 A1 * | 5/2008 | Furihata | G09G 3/2025 345/212 |
| 2010/0238193 A1 * | 9/2010 | Neal | G09G 3/2055 345/596 |
| 2012/0133668 A1 | 5/2012 | Harada et al. | |
| 2015/0070500 A1 * | 3/2015 | Pflug | H04N 9/045 348/148 |

FOREIGN PATENT DOCUMENTS

| | | |
|---|---|---|
| CN | 101227549 | 7/2008 |
| CN | 101415061 | 4/2009 |
| CN | 103970495 | 8/2014 |
| JP | H09311669 | 12/1997 |
| WO | WO-2014127509 | 8/2014 |

OTHER PUBLICATIONS

Liu, Zhenglin, et al., "Image color enhancement technique based on improved Bayer dithering algorithm", J. Huazhong Univ. of Sci. & Tech. (Nature Science Edition), vol. 43, No. 5, (May 2006), 68-70.

* cited by examiner

VIDEO PROCESSING DEVICE AND METHOD

RELATED APPLICATIONS

The present application claims the benefit of Chinese Patent Application No. 201410464820.6, filed on Sep. 12, 2014, the entire disclosure of which is incorporated herein by reference.

FIELD

The present disclosure relates to the field of display technology, particularly to a video processing device and method.

BACKGROUND

Generally, a video signal transmitted from a graphics card of a computer is 8 bit data, thus a 256 gray levels can be displayed on each color channel. If the signals for controlling R, G, B on the panel are all 8 bit, the panel is called a 8 bit panel, namely, a true color panel. Since a pixel consists of three color channels of red (R), green (G) and blue (B), each pixel can display 256*256*256 types of colors on the 8 bit panel. However, the existing 8 bit panel is relatively expensive, the process is relatively complex, therefore, most panels are 6 bit, that is, each color channel of most panels can only display 64 grey levels, and as a result, each pixel point of the 6 bit panel can only display 64*64*64 types of colors.

From the above data, it can be seen that physically, the colors displayed by the 6 bit panel are less than 2% of the 8 bit panel. If no processing is performed, the 6 bit display cannot meet people's requirements definitely. The prior art mainly adopts the methods of dithering algorithm and frame rate control for converting a 6 bit panel into an 8 bit panel. The dithering algorithm starts from the perspective of space to perform color enhancement. Whereas the frame rate control starts from the perspective of time to perform processing. These two algorithms are often used together.

For quickly changing images, the dithering algorithm and the frame rate control algorithm can be used to generate more grey levels. The frame rate control algorithm exactly makes use of a plurality of frames of images to simulate the effect of one frame of the original image, thereby displaying more colors. Due to visual inertia of human eyes, the perceived brightness is accumulation of a plurality of frames. The frame rate control algorithm is mixing colors in time, while the dithering algorithm is mixing colors in space. If several pixel points are close to one another, what the eyes perceived from a distance is a color close to an average of these colors, thereby generating some intermedia grey levels. The dithering algorithm exactly increases number of image display grey levels by adjusting the spatial relationship between the pixels.

As panel color enhancement technologies of a liquid crystal display (LCD), the dithering algorithm and the frame rate control algorithm are widely used, which can use a drive integrated circuit with a relatively lower bit width to achieve a display effect with a higher bit width and more rich colors. In the panel display field, in order to increase the response speed of a liquid crystal display and reduce costs, 6 bit controllers are mostly used to control the R, G, B signals respectively, so as to achieve a display effect of 8 bit video data.

Since the conventional dithering algorithm adopts a fixed dithering matrix, this may result in the processed image accompanied with dithering noise, and significant "block effect" may occur. Take the simplest case of displaying a static image as the example, it is assumed that the image data of each frame is the same, the main reason for generating the block effect is the use of a fixed dithering matrix. For each frame, the algorithm performs completely the same processing to the blocks divided by the dithering matrix. Apparently, the image data is the same, the process of the algorithm processing is also the same, hence with respect to any point on the display, the gray level of the same point never changes. Although dithering is performed in space, from the perspective of time, the grey level of the same point stays the same. There is no color mixing in time, which may give people the visual perception of block effect, and result in a relatively bad display performance of the liquid crystal display.

To sum up, when the prior art uses 6 bit controllers to control the R, G, B signals respectively to achieve the display effect of 8 bit video data, the display performance of the display is relatively bad.

SUMMARY

The embodiment of the present disclosure provides a video processing device and method, for improving display performance of the display.

A first aspect of the present disclosure provides a video processing device, comprising a dual matrix selecting module and a dual channel color data processing module, wherein the dual matrix selecting module is used to select a first dithering matrix and a second dithering matrix respectively when two adjacent frames of images are displayed, and after a dithering matrix is selected, when the same frame of image is displayed, a first row of elements or a second row of elements in the selected dithering matrix is selected for an odd row of pixels, and the selected elements are outputted to the dual channel color data processing module; the other row of elements in the selected dithering matrix is selected for an even row of pixels, and the selected elements are outputted to the dual channel color data processing module, wherein the first dithering matrix and the second dithering matrix are both 2*2 matrices, the second dithering matrix being a rotation matrix of the first dithering matrix;

the dual channel color data processing module is used to compare lower 2 bit video data in an 8 bit video data received by sub-pixels in each row with two selected elements in the selected dithering matrix respectively, when a decimal number to which the lower 2 bit video data corresponds is greater than each of the selected elements in the selected dithering matrix, a higher 6 bit video data to which the lower 2 bit video data corresponds is outputted after being increased by 1; when overflow occurs after being increased by 1, a video data of 111111 is outputted; when the decimal number to which the lower 2 bit video data corresponds is less than or equal to at least one of the selected elements in the selected dithering matrix, the higher 6 bit video data to which the lower 2 bit video data corresponds is outputted directly.

With the video processing device provided by the embodiment of the present disclosure, since the device comprises a dual matrix selecting module and a dual channel color data processing module, by means of the dual channel color data processing module, two groups, i.e. an odd group and an even group, of pixel data can be processed simultaneously within one clock period. Since two dithering matrices are used when two adjacent frames of images are displayed, the structure is simple, and the processing speed is high. The present disclosure uses the algorithm period of two frame cycle for dithering in time and uses the dithering matrix of 2*2 for dithering in space, so as to achieve the effect of dithering 8 bit video data using 6 bit display data. Moreover, by means of two dithering matrices, the display performance of the display can be improved, two groups, i.e. an odd group and an even group, of pixel data are processed simultaneously within one clock, which reduces the working frequency of the circuit.

According to an embodiment, the dual matrix selecting module may comprise a first register for counting frame frequency signals, the first dithering matrix or the second dithering matrix being selected based on a counting value of the frame frequency signals, the first register being a 1 bit register.

As such, since the number of the dithering matrices is 2, when the 1 bit register is used for counting, there are only two counting values, which can match with the dithering matrices and can also save cost.

According to another embodiment, the dual matrix selecting module may comprise a second register for counting row synchronization signals, the first row of elements or the second row of elements in the selected dithering matrix being selected based on a counting value of the row synchronization signals, the second register being a 1 bit register.

As such, since each dithering matrix has two rows, when the 1 bit register is used for counting, there are only two counting values, which can match with each row of the dithering matrix and can also save cost.

According to a further embodiment, the first dithering matrix may be $$\begin{bmatrix} 0 & 2 \\ 3 & 1 \end{bmatrix};$$

and the second dithering matrix may be $$\begin{bmatrix} 1 & 3 \\ 2 & 0 \end{bmatrix}.$$

As such, since the first dithering matrix adopts $$\begin{bmatrix} 0 & 2 \\ 3 & 1 \end{bmatrix},$$

and the second dithering matrix adopts $$\begin{bmatrix} 1 & 3 \\ 2 & 0 \end{bmatrix},$$

the structure of the matrices is simple, and the processing speed is high.

According to yet another embodiment, the dual channel color data processing module may comprise an odd channel color data processing module and an even channel color data processing module, the odd channel color data processing module being used for receiving 8 bit video data inputted in the odd row and elements in the dithering matrix selected for the odd row of pixels;

the even channel color data processing module being used for receiving 8 bit video data inputted in the even row and elements in the dithering matrix selected for the even row of pixels.

As such, when the dual channel color data processing module comprises an odd channel color data processing module and an even channel color data processing module, two groups, i.e., an odd group and an even group, of pixel data can be processed simultaneously within one clock, so as to reduce the working frequency of the circuit.

According to still another embodiment, the odd channel color data processing module may comprise: a red channel color data processing module, a green channel color data processing module and a blue channel color data processing module;

the even channel color data processing module may comprise: a red channel color data processing module, a green channel color data processing module and a blue channel color data processing module.

As such, when the display device performs display, the corresponding R, G, B video data are inputted through the red channel color data processing module, the green channel color data processing module and the blue channel color data processing module respectively for display.

According to an embodiment, the red channel color data processing module, the green channel color data processing module and the blue channel color data processing module all may comprise a subtractor and an adder, the subtractor is used for separating the higher 6 bit video data from the lower 2 bit video data of the received 8 bit video data, comparing the decimal number to which the lower 2 bit video data corresponds with the two selected elements in the selected dithering matrix respectively, and outputting the comparison result and the higher 6 bit video data to which the lower 2 bit video data corresponds to the adder;

the adder is used for outputting the higher 6 bit video data to which the lower 2 bit video data corresponds after being increased by 1 when the received comparison result is that the decimal number to which the lower 2 bit video data corresponds is greater than each of the selected elements in the selected dithering matrix, and outputting the video data of 111111 when overflow occurs after being increased by 1; and outputting the higher 6 bit video data to which the lower 2 bit video data corresponds directly when the received comparison result is that the decimal number to which the lower 2 bit video data corresponds is less than or equal to at least one of the selected elements in the selected dithering matrix.

As such, the effect of dithering 8 bit video data using 6 bit display data is achieved by the subtractor and the adder.

A second aspect of the present disclosure provides a video processing method, comprising:

selecting a first dithering matrix and a second dithering matrix respectively when two adjacent frames of images are displayed, and after a dithering matrix is selected, when the same frame of image is displayed, a first row of elements or a second row of elements in the selected dithering matrix is selected for an odd row of pixels and the other row of elements in the selected dithering matrix is selected for an even row of pixels; wherein the first dithering matrix and the second dithering matrix are both 2*2 matrices, the second dithering matrix being a rotation matrix of the first dithering matrix;

comparing lower 2 bit video data in an 8 bit video data received by sub-pixels in each row with two selected elements in the selected dithering matrix respectively, when a decimal number to which the lower 2 bit video data corresponds is greater than each of the selected elements in the selected dithering matrix, outputting a higher 6 bit video data to which the lower 2 bit video data corresponds after being increased by 1; when overflow occurs after being increased by 1, outputting a video data of 111111; when the decimal number to which the lower 2 bit video data corresponds is less than or equal to at least one of the selected elements in the selected dithering matrix, outputting the higher 6 bit video data to which the lower 2 bit video data corresponds directly.

With the video processing method provided by the embodiment of the present disclosure, since two dithering matrices are used when two adjacent frames of images are displayed, the structure is simple, and the processing speed is high. The present disclosure uses the algorithm period of two frame cycle for dithering in time and uses the dithering matrix of 2*2 for dithering in space, so as to achieve the effect of dithering 8 bit video data using 6 bit display data. Moreover, by means of two dithering matrices, the display performance of the display can be improved.

According to an embodiment, the first dithering matrix or the second dithering matrix may be selected based on a counting value of frame frequency signals.

As such, the first dithering matrix or the second dithering matrix is selected based on the counting value of the frame frequency signals, which is convenient and simple in actual applications.

According to another embodiment, the first row of elements or the second row of elements in the selected dithering matrix may be selected based on a counting value of row synchronization signals.

According to a further embodiment, the first dithering matrix may be $$\begin{bmatrix} 0 & 2 \\ 3 & 1 \end{bmatrix};$$

and the second dithering matrix may be $$\begin{bmatrix} 1 & 3 \\ 2 & 0 \end{bmatrix}.$$

As such, the first row of elements or the second row of elements in the selected dithering matrix is selected based on the counting value of the row synchronization signals, which is convenient and simple in actual applications.

DETAILED DESCRIPTION

The embodiment of the present disclosure provides a video processing device and method, for improving display performance of the display.

The present disclosure adopts a dual channel color data processing module to perform dual channel pixel data inputting, i.e., two groups of pixel data of odd channel R, G, B and even channel R, G, B are inputted simultaneously every clock, thus the clock frequency of the circuit working can be reduced. The 6 bit display used in the specific embodiment of the present disclosure dithers the grey levels of 8 bit color data, which losses 2 bit data, therefore, the specific embodiment of the present disclosure only needs one 2*2 dithering matrix.

Next, the video processing device and method provided by the specific embodiment of the present disclosure will be introduced specifically in combination with the drawings.

Figure 1:
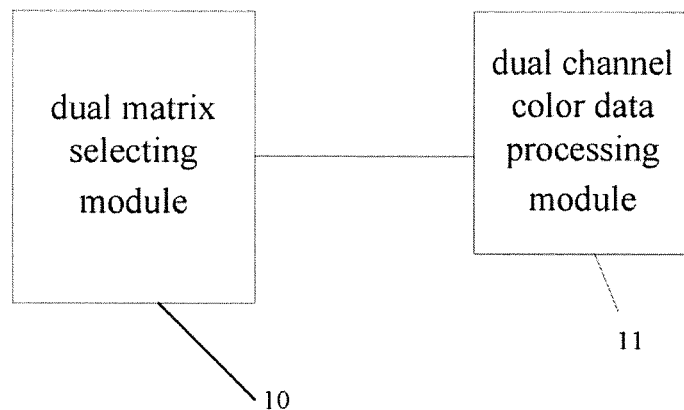
FIG. 1 is a structural schematic view of a video processing device provided by an embodiment of the present disclosure.

As shown in FIG. 1, a specific embodiment of the present disclosure provides a video processing device, the display device comprising a dual matrix selecting module 10 and a dual channel color data processing module 11, wherein, the dual matrix selecting module 10 is used to select a first dithering matrix and a second dithering matrix respectively when two adjacent frames of images are displayed, and after a dithering matrix is selected, when the same frame of image is displayed, a first row of elements or a second row of elements in the selected dithering matrix is selected for an odd row of pixels, and the selected elements are outputted to the dual channel color data processing module 11; the other row of elements in the selected dithering matrix is selected for an even row of pixels, and the selected elements are outputted to the dual channel color data processing module 11, wherein the first dithering matrix and the second dithering matrix are both 2*2 matrices, the second dithering matrix being a rotation matrix of the first dithering matrix;

the dual channel color data processing module 11 is used to compare lower 2 bit video data in an 8 bit video data received by sub-pixels in each row with two selected elements in the selected dithering matrix respectively, when a decimal number to which the lower 2 bit video data corresponds is greater than each of the selected elements in the selected dithering matrix, a higher 6 bit video data to which the lower 2 bit video data corresponds is outputted after being increased by 1; when overflow occurs after being increased by 1, a video data of 111111 is outputted; when the decimal number to which the lower 2 bit video data corresponds is less than or equal to at least one of the selected elements in the selected dithering matrix, the higher 6 bit video data to which the lower 2 bit video data corresponds is outputted directly.

Figure 2:
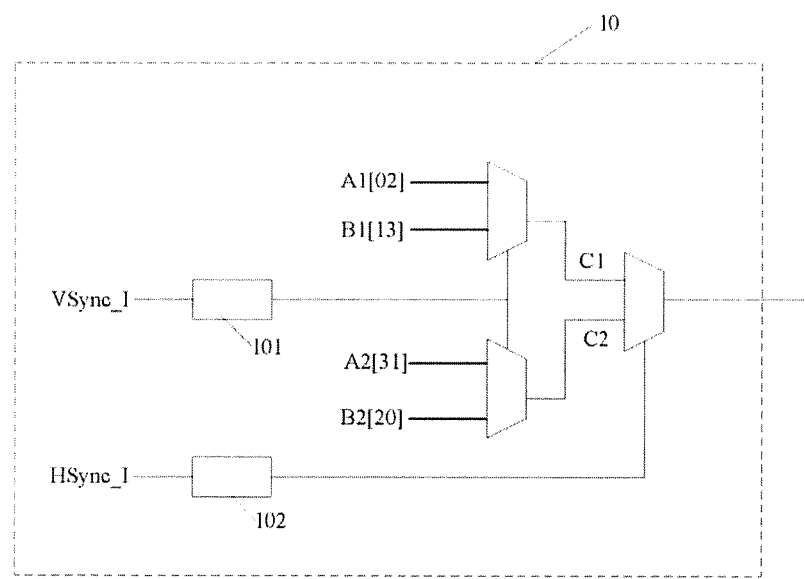
FIG. 2 is a structural schematic view of a dual matrix selecting module in a video processing device provided by an embodiment of the present disclosure.

As shown in FIG. 2, the dual matrix selecting module 10 in the specific embodiment of the present disclosure comprises a first register 101 and a second register 102. The first register 101 is connected with the frame frequency signal input terminal VSync_I, for counting the frame frequency signals, and selecting the first dithering matrix or the second dithering matrix based on the counting value of the frame frequency signals. For example, the first dithering matrix in the specific embodiment of the present disclosure is $$\begin{bmatrix} 0 & 2 \\ 3 & 1 \end{bmatrix},$$

the second dithering matrix is $$\begin{bmatrix} 1 & 3 \\ 2 & 0 \end{bmatrix},$$

wherein the second dithering matrix $$\begin{bmatrix} 1 & 3 \\ 2 & 0 \end{bmatrix}$$

is equivalent to exchange of the values on the diagonal relative to the first dithering matrix $$\begin{bmatrix} 0 & 2 \\ 3 & 1 \end{bmatrix},$$

which aims to enabling the values of the dithering matrix to have a greater degree of rotation in space, so as to avoid stripes caused by the fixed mode in time and in turn improve display performance. The second register 102 is connected with a row synchronization signal input terminal HSync_I, for counting the row synchronization signals, and selecting the first row of elements or the second row of element in the selected dithering matrix based on the counting value of the row synchronization signals. The first register 101 in the specific embodiment of the present disclosure is a 1 bit register, the second register 102 is a 1 bit register.

C1 and C2 in FIG. 2 represent the selection results of the frame counter. As the dithering matrix of the current frame, A1[02] represents two elements in the first row of the first dithering matrix, A2[31] represents two elements in the second row of the first dithering matrix, B1[13] represents two elements in the first row of the second dithering matrix, and B2[20] represents two elements in the second row of the second dithering matrix, Hence, C1, C2 can be A1, A2 or B1, B2.

What are used in the specific embodiment of the present disclosure are two dithering matrices, which are carried out by combining hardware structures such as comparator and certain algorithms; the specific embodiment of the present disclosure is not limited to use of two dithering matrices, instead, other algorithms may use more than two dithering matrices.

Figure 3:
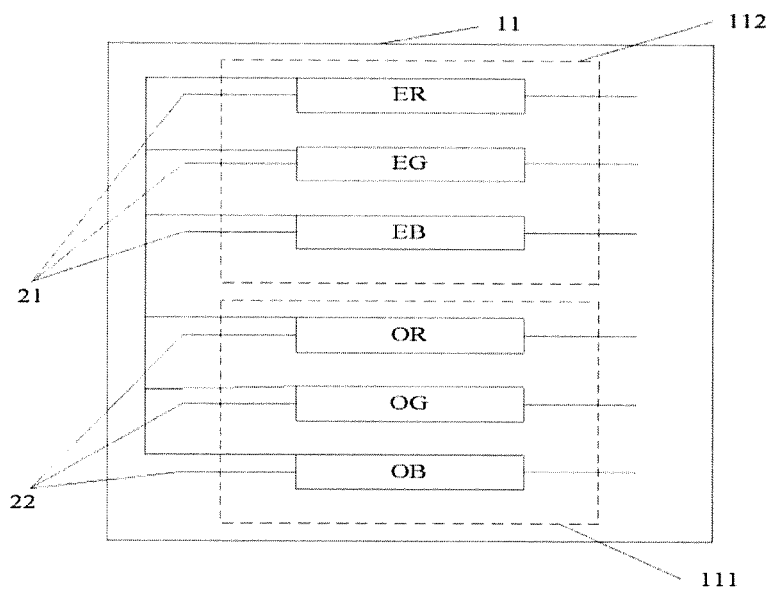
FIG. 3 is structural schematic view of a dual channel color data processing module in a video processing device provided by an embodiment of the present disclosure.

As shown in FIG. 3, the dual channel color data processing module 11 in the specific embodiment of the present disclosure comprises an odd channel color data processing module 111 and an even channel color data processing module 112, the odd channel color data processing module 111 being used for receiving 8 bit video data 22 inputted in the odd row and elements in the dithering matrix selected for the odd row of pixels; the even channel color data processing module 112 being used for receiving 8 bit video data 21 inputted in the even row and elements in the dithering matrix selected for the even row of pixels. The odd channel color data processing module 111 comprises: a red channel color data processing module OR, a green channel color data processing module OG and a blue channel color data processing module OB; the even channel color data processing module 112 comprises: a red channel color data processing module ER, a green channel color data processing module EG and a blue channel color data processing module EB.

Figure 4:
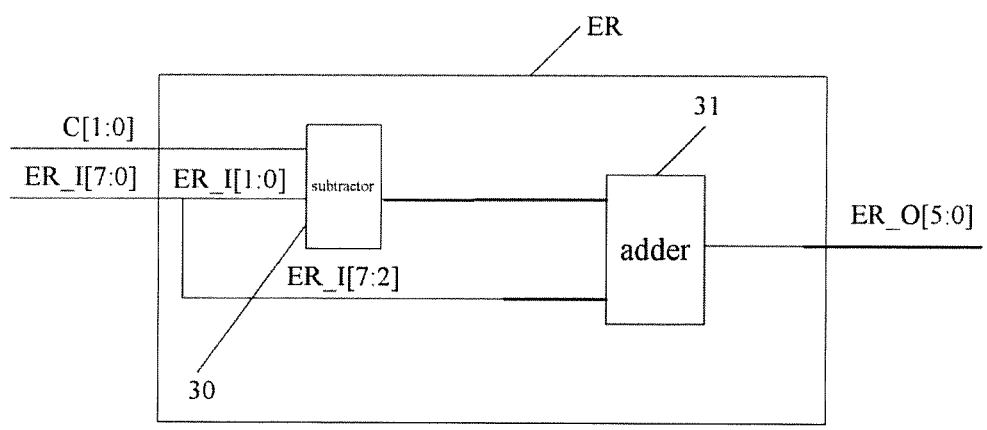
FIG. 4 is a schematic view of the interior structure of one of the channels in the dual channel color data processing module of FIG. 3.

As shown in FIG. 4, the red channel color data processing modules OR and ER, the green channel color data processing modules OG and EG, and the blue channel color data processing modules OB and EB in the specific embodiment of the present disclosure all comprise a subtractor 30 and an adder 31, the processing methods of the six channels of OR, ER, OG, EG, OB and EB to the input signals are completely the same, so the structures in the channels are also completely the same. Only the ER channel is shown in the figure, wherein, the specific functions of the subtractor 30 and the adder 31 will be explained in detail subsequently.

Next, the process of dithering 8 bit video data using 6 bit display data in the specific embodiment of the present disclosure will be explained in detail in combination with FIG. 2 and FIG. 4.

Firstly, the first register 101 receives the frame frequency signals inputted at the frame frequency signal input terminal VSync_I, and counts the frame frequency signals. When the first frame of image is displayed, the counting value of the frame frequency signal is 1; when the second frame of image is displayed, the counting value of the frame frequency signal is increased by 1. Since the first register 101 is a 1 bit register, the counting value of the frame frequency signal here is 0. Similarly, when the third frame of image is displayed, the counting value of the frame frequency signal is increased by 1, and the counting value of the frame frequency signal here is 1 again; when the fourth frame of image is displayed, the counting value of the frame frequency signal is increased by 1, and the counting value of the frame frequency signal here is 0 again. The counting value of the frame frequency signal when each frame of image is displayed thereafter may be deduced by analogy, which will not be repeated here.

When the counting value of the frame frequency signal is 1, the dual matrix selecting module selects the first dithering matrix $$\begin{bmatrix} 0 & 2 \\ 3 & 1 \end{bmatrix};$$

when the counting value of the frame frequency signal is 0, the dual matrix selecting module selects the second dithering matrix $$\begin{bmatrix} 1 & 3 \\ 2 & 0 \end{bmatrix}.$$

Of course when the counting value of the frame frequency signal is 1, the dual matrix selecting module may also select the second dithering matrix $$\begin{bmatrix} 1 & 3 \\ 2 & 0 \end{bmatrix};$$

when the counting value of the frame frequency signal is 0, the dual matrix selecting module may also select the first dithering matrix $$\begin{bmatrix} 0 & 2 \\ 3 & 1 \end{bmatrix}.$$

Specifically, the specific embodiment of the present disclosure makes explanations by taking the example that when odd frame of image is displayed, the counting value of the frame frequency signal is 1, the dual matrix selecting module selects the first dithering matrix $$\begin{bmatrix} 0 & 2 \\ 3 & 1 \end{bmatrix};$$

when even frame of image is displayed, the counting value of the frame frequency signal is 0, the dual matrix selecting module selects the second dithering matrix $$\begin{bmatrix} 1 & 3 \\ 2 & 0 \end{bmatrix}.$$

When the same frame of image is displayed, e.g. when the first frame of image is displayed, the second register 102 receives the row synchronization signals inputted by the row synchronization signal input terminal HSync_I, and counts the row synchronization signals. Since each frame of image in display comprises a plurality of row synchronization signals, wherein the display of each row of pixels is controlled by a corresponding row synchronization signal, when the first row of pixels is displayed, the counting value of the row synchronization signal is 1; when the second row of pixels is displayed, the counting value of the row synchronization signal is increased by 1. Since the second register 102 is a 1 bit register, the counting value of the row synchronization signal here is 0. Similarly, when the third row of pixels is displayed, the counting value of the row synchronization signal is increased by 1, the counting value of the row synchronization signal here is 1 again; when the fourth row of pixel is displayed, the counting value of the row synchronization signal is increased by 1, the counting value of the row synchronization signal here is 0 again. The counting value of the row synchronization signal when each row of pixels is displayed thereafter may be deduced by analogy, which will not be repeated here.

When the counting value of the row synchronization signal is 1, the elements in the first row of the selected dithering matrix are obtained, and the obtained elements are outputted to the odd channel color data processing module 111; when the counting value of the row synchronization signal is 0, the elements in the second row of the selected dithering matrix are obtained, and the obtained elements are outputted to the even channel color data processing module 112. Alternatively, when the counting value of the row synchronization signal is 1, the elements in the second row of the selected dithering matrix can also be obtained; when the counting value of the row synchronization signal is 0, the elements in the first row of the selected dithering matrix can also be obtained.

Specifically, in the specific embodiment of the present disclosure, when the first frame of image is displayed, the dual matrix selecting module 10 selects the first dithering matrix $$\begin{bmatrix} 0 & 2 \\ 3 & 1 \end{bmatrix},$$

the odd channel color data processing module 111 receives the elements 0 and 2 in the first row of this dithering matrix, and the even channel color data processing module 112 receives the elements 3 and 1 in the second row of this dithering matrix. That is: when the first frame of image is displayed, the odd row of pixels correspond to the elements 0 and 2 in the first row of this dithering matrix, the even row of pixels correspond to the elements 3 and 1 in the second row of this dithering matrix. When the second frame of image is displayed, the dual matrix selecting module 10 selects the second dithering matrix $$\begin{bmatrix} 1 & 3 \\ 2 & 0 \end{bmatrix},$$

the odd channel color data processing module 111 receives the elements 1 and 3 in the first row of this dithering matrix, the even channel color data processing module 112 receives the elements 2 and 0 in the second row of this dithering matrix. That is: when the second frame of image is displayed, the odd row of pixels correspond to the elements 1 and 3 in the first row of this dithering matrix, the even row of pixels correspond to the elements 2 and 0 in the second row of this dithering matrix. The dithering algorithm when the odd frame of image is displayed is same as the dithering algorithm when the first frame of image is displayed, and the dithering algorithm when the even frame of image is displayed is same as the dithering algorithm when the second frame of image is displayed.

Next, the algorithm process will be introduced specifically only taking the red channel color data processing module ER as the example.

As shown in FIG. 4, when the video data ER_I[7:0] is inputted, the subtractor 30 receives the video data ER_I[7:0] and C[1:0] outputted by the dual matrix selecting module, wherein, [7:0] in ER_I[7:0] represents the first bit to the eighth bit data in the 8 bit video data, C[1:0] represents the two elements in the first row of the first dithering matrix $$\begin{bmatrix} 0 & 2 \\ 3 & 1 \end{bmatrix},$$

or the two elements in the second row of the first dithering matrix $$\begin{bmatrix} 0 & 2 \\ 3 & 1 \end{bmatrix}.$$

The specific embodiment of the present disclosure is introduced by taking the example that C[1:0] represents the two elements 0 and 2 in the first row of the first dithering matrix $$\begin{bmatrix} 0 & 2 \\ 3 & 1 \end{bmatrix}.$$

The subtractor 30 separates the higher 6 bit video data from the lower 2 bit video data of the received 8 bit video data ER_I[7:0], reserves the higher 6 bit video data with a relatively large information weight, compares the decimal number to which the lower 2 bit video data corresponds with the two elements 0 and 2 in the first row of the first dithering matrix $$\begin{bmatrix} 0 & 2 \\ 3 & 1 \end{bmatrix},$$

and outputs the comparison result and the higher 6 bit video data to which the lower 2 bit video data corresponds to the adder 31.

When the comparison result received by the adder 31 is that the decimal number to which the lower 2 bit video data corresponds is greater than the elements 0 and 2 in the first row of the first dithering matrix $$\begin{bmatrix} 0 & 2 \\ 3 & 1 \end{bmatrix},$$

the higher 6 bit video data to which the lower 2 bit video data corresponds is increased by 1. It will be determined whether overflow occurs to the higher 6 bit video data after being increased by 1. If the overflow occurs, the video data of 111111 will be outputted directly, otherwise, the higher 6 bit video data after being increased by 1 will be outputted. When the comparison result received by the adder 31 is that the decimal number to which the lower 2 bit video data corresponds is less than or equal to the element 0 or 2 in the first row of the first dithering matrix $$\begin{bmatrix} 0 & 2 \\ 3 & 1 \end{bmatrix},$$

the higher 6 bit video data to which the lower 2 bit video data corresponds will be outputted directly, wherein, ER_O[5:0] represents the outputted higher 6 bit video data.

Therefore, the specific embodiment of the present disclosure, in time, uses adjacent odd frame and even frame to simulate the effect of one frame of the original image, in space, uses the dithering matrix of 2*2 to perform dithering, which achieves the effect of dithering 8 bit video data using 6 bit display data.

Figure 5:
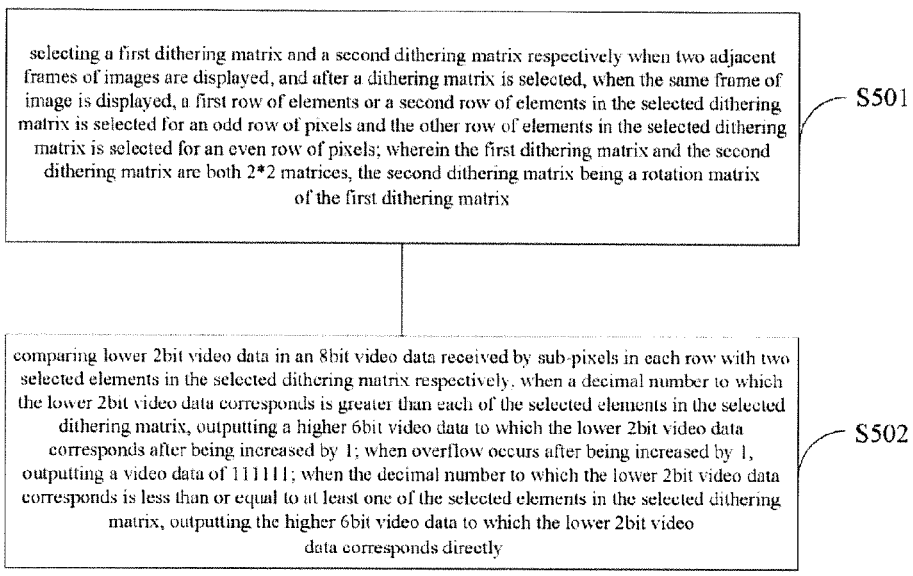
FIG. 5 is a flow chart of a video processing method provided by an embodiment of the present disclosure.

As shown in FIG. 5, a specific embodiment of the present disclosure further provides a video processing method, comprising:

At S501, selecting a first dithering matrix and a second dithering matrix respectively when two adjacent frames of images are displayed, and after a dithering matrix is selected, when the same frame of image is displayed, a first row of elements or a second row of elements in the selected dithering matrix is selected for an odd row of pixels and the other row of elements in the selected dithering matrix is selected for an even row of pixels; wherein the first dithering matrix and the second dithering matrix are both 2*2 matrices, the second dithering matrix being a rotation matrix of the first dithering matrix;

At S502, comparing lower 2 bit video data in an 8 bit video data received by sub-pixels in each row with two selected elements in the selected dithering matrix respectively, when a decimal number to which the lower 2 bit video data corresponds is greater than each of the selected elements in the selected dithering matrix, outputting a higher 6 bit video data to which the lower 2 bit video data corresponds after being increased by 1; when overflow occurs after being increased by 1, outputting a video data of 111111; when the decimal number to which the lower 2 bit video data corresponds is less than or equal to at least one of the selected elements in the selected dithering matrix, outputting the higher 6 bit video data to which the lower 2 bit video data corresponds directly.

To sum up, alternate use of two dithering matrices in the dual matrix selecting module in the video processing device of specific embodiments of the present disclosure forms perfect cooperation with the color data input in the dual channel color data processing module, which can process two groups, i.e., an odd group and an even group, of pixel data simultaneously within one clock period, and achieve the effect of dithering 8 bit video data using 6 bit display data. Since the specific embodiments of the present disclosure utilizes two dithering matrices, the structure is simple, and the processing speed is high. Moreover, the algorithm period of two frame cycle is used for the dithering in time, and a dithering matrix of 2*2 is used for the dithering in space, thus two groups, i.e., an odd group and an even group, of data are processed simultaneously within one clock, which reduces the working frequency of the circuit. Meanwhile, relative to the method of directly using 8 bit display data to output 8 bit video data in the prior art, large amount of registers can be saved, and the area of the timing controller can be reduced.

Apparently, the skilled person in the art can make various modifications and variants to the present disclosure without departing from the spirit and scope of the present disclosure. In this way, provided that these modifications and variants of the present disclosure belong to the scopes of the claims of the present disclosure and the equivalent technologies thereof, the present disclosure also intends to cover these modifications and variants.

The invention claimed is:

1. A video processing device, comprising: a dual matrix selecting module and a dual channel color data processing module, wherein
the dual matrix selecting module is used to select one of a first dithering matrix and a second dithering matrix when one of two adjacent frames of images is displayed, and select the other one of the first dithering matrix and the second dithering matrix when the other one of said two adjacent frames of images is displayed, wherein after a dithering matrix is selected, when the same frame of image is displayed, a first row of elements or a second row of elements in the selected dithering matrix is selected for an odd row of pixels, and the selected elements are outputted to the dual channel color data processing module; the other row of elements in the selected dithering matrix is selected for an even row of pixels, and the selected elements are outputted to the dual channel color data processing module, wherein the first dithering matrix and the second dithering matrix are both 2*2 matrices, the second dithering matrix being a rotation matrix of the first dithering matrix;
the dual channel color data processing module is used to compare lower 2 bit video data in an 8 bit video data received by sub-pixels in each row with two selected elements in the selected dithering matrix respectively, wherein when a decimal number to which the lower 2 bit video data corresponds is greater than each of the selected elements in the selected dithering matrix, a higher 6 bit video data to which the lower 2 bit video data corresponds is outputted after being increased by 1; when overflow occurs after being increased by 1, a video data of 111111 is outputted; when the decimal number to which the lower 2 bit video data corresponds is less than or equal to at least one of the selected elements in the selected dithering matrix, the higher 6 bit video data to which the lower 2 bit video data corresponds is outputted directly.

2. The video processing device according to claim 1, wherein the dual matrix selecting module comprises a first register for counting frame frequency signals, the first dithering matrix or the second dithering matrix being selected based on a counting value of the frame frequency signals, the first register being a 1 bit register.

3. The video processing device according to claim 1, wherein the dual matrix selecting module comprises a second register for counting row synchronization signals, the first row of elements or the second row of elements in the selected dithering matrix is selected based on a counting value of the row synchronization signals, the second register being a 1 bit register.

4. The video processing device according to claim 1, wherein the first dithering matrix is $$\begin{bmatrix} 0 & 2 \\ 3 & 1 \end{bmatrix};$$

and the second dithering matrix is $$\begin{bmatrix} 1 & 3 \\ 2 & 0 \end{bmatrix}.$$

5. The video processing device according to claim 1, wherein the dual channel color data processing module comprises an odd channel color data processing module and an even channel color data processing module,
the odd channel color data processing module being used for receiving 8 bit video data inputted in the odd row and elements in the dithering matrix selected for the odd row of pixels;
the even channel color data processing module being used for receiving 8 bit video data inputted in the even row and elements in the dithering matrix selected for the even row of pixels.

6. The video processing device according to claim 5, wherein the odd channel color data processing module comprises: a red channel color data processing module, a green channel color data processing module and a blue channel color data processing module;
the even channel color data processing module comprises: a red channel color data processing module, a green channel color data processing module and a blue channel color data processing module.

7. The video processing device according to claim 6, wherein the red channel color data processing module, the green channel color data processing module and the blue channel color data processing module all comprise a subtractor and an adder, the subtractor is used for separating the higher 6 bit video data from the lower 2 bit video data of the received 8 bit video data, comparing the decimal number to which the lower 2 bit video data corresponds with the two selected elements in the selected dithering matrix respectively, and outputting the comparison result and the higher 6 bit video data to which the lower 2 bit video data corresponds to the adder;
the adder is used for outputting the higher 6 bit video data to which the lower 2 bit video data corresponds after being increased by 1 when the received comparison result is that the decimal number to which the lower 2 bit video data corresponds is greater than each of the selected elements in the selected dithering matrix, and outputting the video data of 111111 when overflow occurs after being increased by 1; and outputting the higher 6 bit video data to which the lower 2 bit video data corresponds directly when the received comparison result is that the decimal number to which the lower 2 bit video data corresponds is less than or equal to at least one of the selected elements in the selected dithering matrix.

8. A video processing method, comprising:
selecting one of a first dithering matrix and a second dithering matrix when one of two adjacent frames of images is displayed, and selecting the other one of the first dithering matrix and the second dithering matrix when the other one of said two adjacent frames of images is displayed, wherein after a dithering matrix is selected, when the same frame of image is displayed, a first row of elements or a second row of elements in the selected dithering matrix is selected for an odd row of pixels and the other row of elements in the selected dithering matrix is selected for an even row of pixels; wherein the first dithering matrix and the second dithering matrix are both 2*2 matrices, the second dithering matrix being a rotation matrix of the first dithering matrix;
comparing lower 2 bit video data in an 8 bit video data received by sub-pixels in each row with two selected elements in the selected dithering matrix respectively, when a decimal number to which the lower 2 bit video data corresponds is greater than each of the selected elements in the selected dithering matrix, outputting a higher 6 bit video data to which the lower 2 bit video data corresponds after being increased by 1; when overflow occurs after being increased by 1, outputting a video data of 111111; when the decimal number to which the lower 2 bit video data corresponds is less than or equal to at least one of the selected elements in the selected dithering matrix, outputting the higher 6 bit video data to which the lower 2 bit video data corresponds directly.

9. The method according to claim 8, wherein the first dithering matrix or the second dithering matrix is selected based on a counting value of frame frequency signals.

10. The method according to claim 8, wherein the first row of elements or the second row of elements in the selected dithering matrix is selected based on a counting value of row synchronization signals.

11. The method according to claim 8, wherein the first dithering matrix is $$\begin{bmatrix} 0 & 2 \\ 3 & 1 \end{bmatrix};$$

and the second dithering matrix is $$\begin{bmatrix} 1 & 3 \\ 2 & 0 \end{bmatrix}.$$

* * * * *